Figure 1:
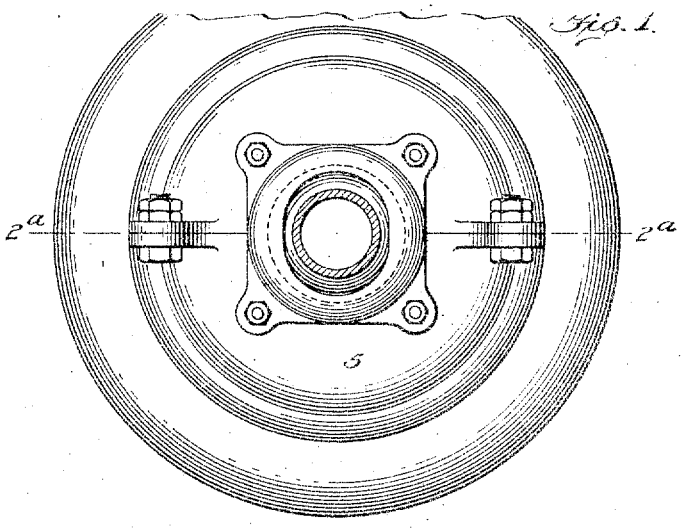

W. T. GODDARD.

INSULATOR.

APPLICATION FILED APR. 9, 1920.

BEST AVAILABLE COPY

Reissued June 22, 1920.

14,888.

Inventor

Walter T. Goddard

Witness

Edwin L. Bradford

By Frank S. Meclin his Attorney

BEST AVAILABLE COPY

UNITED STATES PATENT OFFICE.

WALTER T. GODDARD, OF HAMILTON, ONTARIO, CANADA, ASSIGNOR TO THE LOCKE INSULATOR MFG. CO., OF VICTOR, NEW YORK, A CORPORATION OF NEW YORK.

INSULATOR.

14,888. Specification of Reissued Letters Patent. Reissued June 22, 1920.

Original No. 1,311,067, dated July 22, 1919, Serial No. 102,288, filed June 7, 1916. Application for reissue filed April 9, 1920. Serial No. 372,683.

*To all whom it may concern:*

Be it known that I, WALTER T. GODDARD, a citizen of the United States, residing at Hamilton, in the Province of Ontario, Dominion of Canada, have invented certain new and useful Improvements in Insulators; and I do hereby declare the following to be a full, clear, and exact description of the same, reference being had to the accompanying drawings, forming a part of this specification, and to the reference numerals marked thereon.

My invention relates to insulators, with reference particularly to the type wherein the insulator is mounted upon a fibrous, wooden, or other character of supporting pin, and it has for its purpose to improve the construction of the particular class of insulators which embody a series of insulating sections nested one within the other. The principal object of the invention is so to construct the insulating sections of an insulator of this type that the exposed portions of the joint between adjacent sections will lie below the juncture of the skirt and body portion of the upper section forming the joint, and the exterior meeting faces of the sections will form an unobstructed surface without acute change in direction, whereby the said joints become readily accessible for cleaning and the entire insulator presents a substantially continuous exterior surface free from acute angles or bends which, by offering lodgment for dust and dirt, interfere with the efficient action of the insulator.

Another object of the invention is to provide an insulator in which the nested sections may be so constructed and arranged as to afford a stronger and more durable construction, having as one of the advantageous characteristics the even distribution throughout the different portions of the insulator of the strains to which it is subjected, as distinguished from prior insulators of this general type in which the strain is localized at a single point, or in a single direction and results in greater likelihood of the insulator breaking, or cracking at such point, and it is to overcome this disadvantage and thereby equalize the strength of the insulator at its different portions that I have designed the present structure. To these and other ends the invention consists in certain improvements and combinations of parts all as will be hereinafter more fully described, the novel features being pointed out in the claims at the end of the specification.

In the drawings,—

Figure 2:
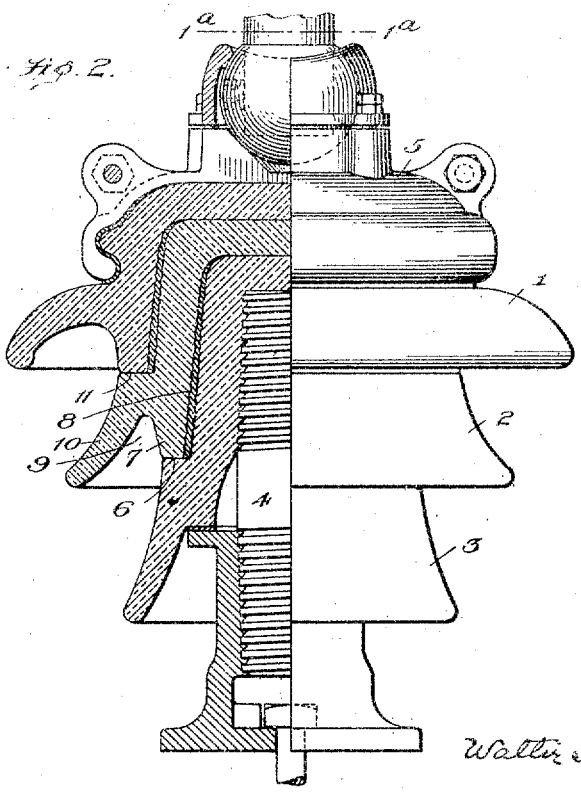

Figure 1 is a plan view, taken partially in section on the line 1ª—1ª of Fig. 2, and showing a pin type insulator embodying the present improvement, and Fig. 2 is a sectional view on line 2ª—2ª of Fig. 1.

Similar reference numerals throughout the several views indicate the same parts.

My invention may be carried out in a variety of different ways, and it will be understood that the present embodiment is intended merely as illustrative of one method for obtaining the desired purposes, and in the structure shown, the insulator includes a series of insulating sections, designated generally as 1, 2, and 3, and mounted upon a pin 4, the latter, however, constituting no essential part of the invention. 5 is a metal cap by means of which the conductor is connected to and mounted upon the insulator.

It will be observed that the insulator herein disclosed comprises three insulating sections each of which is hollow, the innermost section being arranged to receive the supporting pin. Said innermost section 3 includes a lateral shoulder, or offset or projecting portion 6, arranged between the ends of the section, and extending around the body or central portion thereof and operating to support the adjacent insulating section in the manner which will now appear. Said adjacent section 2 surrounds the inner end of the innermost section 3, transmitting strain to and preferably abutting against the end surface of the latter, and in this respect the structure is generally similar to old types of insulators, the chief difficulty with which has been that when strain is exerted upon the insulator from the conductor it is all directed in a single line toward said meeting surface of the sections, or practically at a single point, which frequently results in fracturing the insulator. In order to overcome this, it is my purpose to support the outer insulating section in

BEST AVAILABLE COPY such a manner as to distribute the strain equally along its inner surface, and this is preferably accomplished by supporting the outer section at different points, or upon a plurality of independent surfaces arranged in spaced relation to each other and at angles to, or crosswise of, the longitudinal axis of the insulator. In the structure illustrated, the section 2 embodies lower edge 7 at its inner portion, and said edge communicates strain to and preferably engages and rests upon the shoulder 6, it being understood that the insulating sections are caused to adhere to one another by a cementing medium preferably arranged between them in the space indicated by 8. It will be seen that by supporting the outer section 2 upon the inner section 3, both at the innermost end of the latter and also upon the shoulder 6, any strain that is created is distributed along the length of the outer section from its inner end to the lower edge 7, or, in other words, the strain is distributed equally along the portion lying between the two supporting surfaces formed by the inner end of the section 3 and by the shoulder or projecting portion 6. The surfaces referred to are shown in parallel relation to one another, although not necessarily so, and may be otherwise arranged provided they are at angles to, or crosswise of, the longitudinal axis of the insulator unit. The sections 2 and 3 are so formed that the outer surfaces thereof, adjacent to the shoulder 6, form a continuation of one another, presenting a smooth and unobstructed surface which can be readily cleaned and is quite accessible, as is also the recess 9 that is formed by the skirt 10. The outermost insulating section 1 is attached to the intermediate section 2 in the same manner that the latter is mounted upon the innermost section 3, and it is unnecessary to describe these parts in any further detail. It is to be observed, however, that the insulator heretofore described is provided with a plurality of skirted sections and that the angle formed between the skirt of one section and the vertical axis of the insulator is less than the corresponding angle formed by the skirt portion of the section next above. The base portion of each section is also of less radial distance from the vertical axis of the insulator than the base portion of the adjacent section immediately above the same. By this construction the side walls of the sections are maintained substantially uniform and are comparatively thin and the leakage distance over the insulator is much greater than in former insulators of this general type. While the insulator may embody two, three or more insulating sections, my invention resides in the particular manner of supporting each section upon the adjacent one, irrespective of whether the insulating unit embodies more than two sections, or otherwise. The sections 1 and 2 are also constructed so as to form a continuous surface by their adjacent meeting portions, on opposite sides of the shoulder 11 of the section 2, and it will be seen that by this arrangement the entire insulating unit presents a continuous exterior of such curves as will permit ready access and proper cleaning, effectively preventing any such collection of dirt as will interfere with the proper operation of the insulator, and this I consider to be an extremely important advantage of my improvement.

I claim as my invention:—

1. An insulator comprising a plurality of integral hollow insulating sections closed at their upper ends and nested one within the other, at least one of said sections involving a body portion adapted to extend within the hollow section next above, an outwardly and downwardly projecting skirt portion joining said body portion above the lower edge of the latter, the outer faces of said skirt and of the portion of said body below the junction of said skirt and body respectively forming obtuse angles with the outer faces of adjacent corresponding body and skirt portions formed on the coacting insulating sections.

2. An insulator comprising a plurality of integral hollow insulating sections closed at their upper ends and nested one within the other, at least one of said sections involving a body portion adapted to extend within the hollow section next above, a shoulder formed on said body portion intermediate the ends thereof and adapted to form a seat for the said upper section, a skirt portion extending outwardly and downwardly from said shoulder, the outer faces of said skirt and of the portion of the body below the said shoulder respectively forming obtuse angles with the outer adjacent faces of the coacting insulating sections.

3. An insulator comprising a plurality of integral hollow insulating sections closed at their upper ends and nested one within the other, each of said sections involving a body portion having an outwardly and downwardly extending skirt portion formed thereon, the angle formed by the skirt portion of one section with the vertical axis of the insulator being less than the corresponding angle formed by the skirt portion of the section next above, the body portion of at least one of said sections being provided with a shoulder which extends at an angle to the vertical axis of said section, the said shoulder and top of the body portion of the said section being adapted to form bearing surfaces to receive strains transmitted by the said upper section, a portion of the said body of the said section extend-

BEST AVAILABLE COPY ing below the juncture of the said skirt and body portion, the outer faces of the said skirt and of the body portion below the juncture of the skirt and body respectively forming obtuse angles with the outer faces of the adjacent corresponding body and skirt portions formed on the coacting insulating sections, and means for uniting the said sections.

4. An insulator comprising a plurality of hollow insulating sections closed at their upper ends and nested one within the other, one of said sections being intermediate of others, the intermediate section involving a body portion and a skirt portion connected thereto between the ends thereof, the outer faces of the skirt portion and of the body portion which extends below the juncture of the skirt and body portions forming continuations of the adjacent outer faces of the sections next above and below the said intermediate section, whereby the joints of the several sections present a continuous and unobstructed surface free from acute angular changes in direction.

5. An insulator comprising a plurality of insulating sections closed at their upper ends and each provided with a hollow body portion of less diameter than the section next above and extending into the hollow interior of said upper section, each of said sections having an outwardly and downwardly projecting skirt adjacent its base, and a bearing surface on each of said sections, the side walls of said sections being relatively thin and spaced to receive cementing material, the said bearing surfaces on a plurality of said sections being at different radial distances from the vertical axis of the insulator and each being spaced vertically from the juncture of the interior surface of the skirt with the body portion of the section on which said bearing surface is formed.

WALTER T. GODDARD.